United States Patent [19]

Lambert, Jr.

[11] 4,242,214

[45] Dec. 30, 1980

[54] ANTIFREEZE COMPOSITION CONTAINING A CORROSION INHIBITOR COMBINATION

[75] Inventor: Clifford L. Lambert, Jr., Georgetown, Tex.

[73] Assignee: Texaco Development Corporation, White Plains, N.Y.

[21] Appl. No.: 85,835

[22] Filed: Oct. 17, 1979

Related U.S. Application Data

[63] Continuation-in-part of Ser. No. 909,735, May 25, 1978, abandoned.

[51] Int. Cl.³ ............................................. C09K 5/00
[52] U.S. Cl. ........................................................ 252/75
[58] Field of Search ............................. 252/74, 75, 76

[56] References Cited

U.S. PATENT DOCUMENTS

| | | | |
|---|---|---|---|
| 3,228,884 | 1/1966 | Daignault et al. | 252/75 |
| 3,282,846 | 11/1966 | Scott | 252/75 |
| 3,362,910 | 1/1968 | Ordelt et al. | 252/75 |
| 3,414,519 | 12/1968 | Beynon | 252/75 |
| 3,769,220 | 10/1973 | Willard | 252/75 |

FOREIGN PATENT DOCUMENTS

| | | | |
|---|---|---|---|
| 1154976 | 9/1963 | Fed. Rep. of Germany | 252/75 |
| 1266564 | 6/1961 | France | 252/75 |
| 838258 | 6/1960 | United Kingdom | 252/74 |
| 1499019 | 1/1978 | United Kingdom | 252/75 |

OTHER PUBLICATIONS

West *Additives for Corrosion Control,* Soap & Chemical Specialties, Sep. 1964, pp. 177, 178, 212 & 213, Oct. 1964, pp. 192, 193 & 226.

*Primary Examiner*—Harris A. Pitlick
*Attorney, Agent, or Firm*—Carl G. Ries; Robert A. Kulason; Kenneth R. Priem

[57] ABSTRACT

The invention is a synergistic combination of inhibitors which effectively prevents corrosion in automotive cooling systems containing antifreeze solution based on water-soluble alcohols. The combination includes sodium tetraborate, sodium benzoate, sodium metaborate, sodium metasilicate and tolyltriazole or benzotriazole.

10 Claims, No Drawings

ANTIFREEZE COMPOSITION CONTAINING A CORROSION INHIBITOR COMBINATION

This application is a continuation-in-part of co-pending application Ser. No. 909,735, filed May 25, 1978 now abandoned.

BACKGROUND OF THE INVENTION

1. Field of the Invention

The invention pertains to a corrosion inhibitor combination for cooling systems containing antifreeze with solutions based on water soluble alcohols.

2. Description of the Prior Art

The prior art teaches that each of the inhibitors included in the antifreeze composition of this invention is effective in preventing corrosion in automotive antifreeze.

U.S. Pat. No. 3,769,220 discloses an example of a good quality antifreeze of the prior art. My invention provides an improvement over such formulations.

SUMMARY OF THE INVENTION

The invention is a synergistic combination of inhibitors which is effective in preventing corrosion in cooling systems containing antifreeze solution based on water-soluble alcohols. The combination of the invention and the concentration ranges as weight percent of the antifreeze composition adapted to be added to water are as follows:

|  | Concentration range weight percent |
|---|---|
| tetraborate* | about 0.5 to 2.5 |
| benzoate* | about 0.5 to 2.5 |
| metaborate* | about 0.5 to 1.0 |
| metasilicate* | about 0.02 to 0.8 |
| tolyltriazole or benzotriazole | about 0.05 to 0.6 |

*The weight percent of the ingredients is based in the anions. The additives are usually added as a soluble salt with the cation usually being sodium or potassium. The weight ranges above would also apply if based on the salts.

The antifreeze composition of this invention is useful for general antifreeze service in automotive engines.

DESCRIPTION OF THE PREFERRED EMBODIMENTS

The combination and concentration of inhibitors of our invention give good corrosion protection to copper, solder, brass, steel, iron and aluminum.

The present combination provides improved corrosion protection over prior art antifreezes such as the one disclosed in U.S. Pat. No. 3,769,220 noted above especially in the area of nucleate boiling for aluminum. The present composition avoids the need for the phosphate ion which may cause nucleate boiling corrosion of aluminum surfaces and is a probably cause of solder "bloom". Salt precipitation in hard water is also avoided by avoiding use of the phosphate ion. The present formulation is, however, compatible with the phosphate ion.

Precipitation does not occur in our antifreeze composition when stored at 140° F. or lower and the inhibitor combination is compatible with chromate filters. In addition, the inhibitor combination does not contribute harmfully to aluminum water pump cavitation corrosion. When the antifreeze composition of our invention is to be utilized in a heat exchange system, it may be combined with water in any proportions. The antifreeze compositions of our invention may contain conventional additives such as dyes, antifoam agents, etc. For example, suitable antifoam agents include silicone emulsions and polyglycols. Especially efficient polyglycol antifoam agents are block copolymers prepared by adding ethylene oxide to polypropylene glycol, for example, "Pluronic L61", a product of the Wyandotte Chemical Company.

The freezing point depressants of the present invention include any of the water miscible liquid alcohols such as monohydroxy lower alkyl alcohols and the liquid polyhydroxy alcohols such as the alkylene and dialkylene glycols. Specific examples of the alcohol contemplated herein are methanol, ethanol, propanol, isopropanol, butanol, ethylene glycol, diethylene glycol, propylene glycol, butylene glycol and mixtures thereof. A preferred glycol is ethylene glycol, which as sold commercially often contains a small amount, up to 10% by weight, of diethylene glycol. The term ethylene glycol as used herein is intended to include either the pure or commercial compound. This is also true of the other freezing point depressant alcohols contemplated herein.

The following examples illustrate the preparation and testing of antifreeze compositions of this invention. Example III shows the synergistic effect between the metasilicate and metaborate ions.

EXAMPLE I

To 953.0 grams of ethylene glycol is added 15.0 grams of sodium tetraborate five mol hydrate and the mixture agitated until dissolved. Then, 25.0 grams of sodium benzoate is added and dissolved followed by 2.0 grams of 50% aqueous sodium hydroxide, 2.0 grams of sodium metasilicate five mol hydrate and 3.0 grams of tolyltriazole. All of the above are mutually dissolved. The sodium hydroxide converts part of the tetraborate ion to the metaborate form in situ.

Testing the above by the ASTM D-1384 Glassware Corrosion test gave the following results.

| Weight loss, mg./specimen | | | | | |
|---|---|---|---|---|---|
| Copper | Solder | Brass | Steel | Iron | Aluminum |
| 0 | −2 | 0 | 1 | 6 | 8 |

Values found from commercially available antifreezes typically gave results of 20 or above for one or more of the above metal specimens when tested in the same manner.

EXAMPLE II

To 33.47 pounds of ethylene glycol is added 240 grams of sodium tetraborate five mol hydrate and the mixture agitated until dissolved. Then 400 grams of sodium benzoate is added and dissolved. 32 grams of 50% sodium hydroxide, 32 grams of sodium metasilicate five mol hydrate and 48 grams of deionized water are mutually dissolved and added to the above solution. Finally 48 grams of tolyltriazole is added and the whole dissolved.

Testing this by the ASTM D-2570 Simulated Service test gave the following results which are compared to results from an antifreeze preparation made according to U.S. Pat. No. 3,769,220:

| Weight loss, mg./specimen | | | | | |
| --- | --- | --- | --- | --- | --- |
| Copper | Solder | Brass | Steel | Iron | Aluminum |
| 2 | 0 | 2 | 6 | 6 | −3 |

| U.S. Pat. 3,769,220 | | | | | |
| --- | --- | --- | --- | --- | --- |
| Copper | Solder | Brass | Steel | Iron | Aluminum |
| 12 | 114 | 13 | 0 | −2 | 37 |

EXAMPLE III

This example demonstrates the synergism between metasilicate and metaborate ions in aluminum protection. The test used was the ASTM D-1384 glassware test modified by concentration (25% concentration by volume rather than the prescribed 33⅓%) to allow more corrosion and thus, accentuate the synergistic effect.

The synergistic effect is clearly shown since the formulation of the invention (A) is superior in aluminum corrosion protection to formulation (B) where the metasilicate was omitted or formulation (C) where the sodium hydroxide was omitted.* In each case the total amount of inhibitor was the same.

*The sodium hydroxide converts part of the tetraborate ion to the metaborate form in situ.

| | Concentration, grams | | |
| --- | --- | --- | --- |
| Formulation | A | B | C |
| Ethylene glycol | 960 | 960 | 960 |
| Sodium tetraborate 5H₂O | 15 | 15 | 15 |
| Sodium benzoate | 15 | 15 | 15 |
| Sodium metasilicate 5H₂O | 2 | 0 | 4 |
| Water, deionized | 5 | 5 | 5 |
| Sodium hydroxide, 50% | 2 | 4 | 0 |
| Tolyltriazole | 1 | 1 | 1 |
| TOTAL | 1000 | 1000 | 1000 |
| Weight loss, mg. | | | |
| aluminum | 43 | 65 | 67 |
| iron | 8 | 140 | 3 |
| brass | 1 | 1 | 1 |
| solder | 1 | 3 | 8 |
| copper | 2 | 0 | 1 |
| steel | 0 | 0 | 0 |

*The sodium hydroxide converts part of the tetraborate ion to the metaborate form in situ.

I claim:

1. A corrosion inhibited antifreeze composition consisting essentially of a water soluble liquid alcohol freezing point depressant and an inhibitor combination consisting essentially of the following components wherein the concentration ranges of the inhibitor components are weight percent of said composition:
   about 0.5 to 2.5 percent tetraborate ion,
   about 0.5 to 2.5 percent benzoate ion,
   about 0.05 to 1.0 percent metaborate ion,
   about 0.02 to 0.8 percent metasilicate ion and
   about 0.05 to 0.6 percent tolyltriazole.

2. An antifreeze composition as in claim 1 wherein the liquid alcohol freezing point depressant is ethylene glycol.

3. A process for inhibiting the corrosion of metals which come in contact with an antifreeze composition, which comprises contacting the surface of the metal to be inhibited against corrosion with the antifreezing composition of claim 1.

4. A process as in claim 3 wherein the liquid alcohol freezing point depressant is ethylene glycol.

5. A corrosion inhibited antifreeze composition consisting essentially of a water soluble liquid alcohol freezing point depressant and an inhibitor combination consisting essentially of the following components wherein the concentration ranges of the inhibitor components are weight percent of said composition:
   about 0.5 to 2.5 percent tetraborate ion,
   about 0.5 to 2.5 percent benzoate ion,
   about 0.05 to 1.0 percent metaborate ion,
   about 0.02 to 0.8 percent metasilicate ion and
   about 0.05 to 0.6 percent benzotriazole.

6. An antifreeze composition as in claim 5 wherein the liquid alcohol freezing point depressant is ethylene glycol.

7. A process for inhibiting the corrosion of metals which come in contact with an antifreeze composition, which comprises contacting the surface of the metal to be inhibited against corrosion with the antifreezing composition of claim 5.

8. A process as in claim 6 wherein the liquid alcohol freezing point depressant is ethylene glycol.

9. A corrosion inhibited antifreeze composition consisting essentially of a water soluble liquid alcohol freezing point depressant and an inhibitor combination consisting essentially of the following components wherein the concentration ranges of the inhibitor components are weight percent of said composition:
   about 0.5 to 2.5 percent sodium tetraborate,
   about 0.5 to 2.5 percent sodium benzoate,
   about 0.05 to 1.0 percent sodium metaborate,
   about 0.02 to 0.8 percent sodium metasilicate and
   about 0.05 to 0.6 percent tolytriazole.

10. A corrosion inhibited antifreeze composition consisting essentially of a water soluble liquid alcohol freezing point depressant and an inhibitor combination consisting essentially of the following components wherein the concentration ranges of the inhibitor components are weight percent of said composition:
    about 0.5 to 2.5 percent sodium tetraborate,
    about 0.5 to 2.5 percent sodium benzoate,
    about 0.05 to 1.0 percent sodium metaborate,
    about 0.02 to 0.8 percent sodium metasilicate and
    about 0.05 to 0.6 percent benzotriazole.

* * * * *

Disclaimer 4,242,214.—*Clifford L. Lambert, Jr.*, Georgetown, Tex. ANTIFREEZE COMPOSITION CONTAINING A CORROSION INHIBITOR COMBINATION. Patent dated Dec. 30, 1980. Disclaimer filed Dec. 30, 1983, by the assignee, *Texaco Development Corp.*

Hereby enters this disclaimer to claims 1 through 10 of said patent.

[*Official Gazette February 28, 1984.*]